(12) United States Patent
Liu et al.

(10) Patent No.: US 12,256,131 B2
(45) Date of Patent: Mar. 18, 2025

(54) SYSTEM AND METHOD FOR INTERACTIVE WEB-BROWSING VIA USER EQUIPMENT

(71) Applicant: HYTTO PTE. LTD., Singapore (SG)

(72) Inventors: Dan Liu, Guangdong (CN); Jilin Qiu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/541,008

(22) Filed: Dec. 15, 2023

(65) Prior Publication Data

US 2024/0147024 A1 May 2, 2024

Related U.S. Application Data

(62) Division of application No. 18/048,817, filed on Oct. 21, 2022, now Pat. No. 11,943,516.

(51) Int. Cl.
*H04N 21/81* (2011.01)
*A61H 19/00* (2006.01)
(Continued)

(52) U.S. Cl.
CPC ......... *H04N 21/8173* (2013.01); *A61H 19/00* (2013.01); *A63F 13/60* (2014.09); *H04N 21/2187* (2013.01); *H04N 21/42203* (2013.01); *H04N 21/44213* (2013.01); *H04N 21/47205* (2013.01); *A61H 2201/5012* (2013.01)

(58) Field of Classification Search
CPC .......... H04N 21/8173; H04N 21/2187; H04N 21/42203; H04N 21/44213; H04N 21/47205; H04N 21/4781; H04N 21/4788; A61H 19/00; A61H 2201/5012; A63F 13/60; A63F 13/86; A63F 13/87
See application file for complete search history.

(56) References Cited

U.S. PATENT DOCUMENTS 9,691,429 B2 6/2017 Leiberman et al.
9,762,515 B1 * 9/2017 Olivares ................ G06Q 20/18
(Continued)

OTHER PUBLICATIONS

U.S. Appl. No. 18/048,817.
Office Action dated Jan. 2, 2025, in corresponding U.S. Appl. No. 18/069,194, 23 pages.

*Primary Examiner* — Alazar Tilahun
(74) *Attorney, Agent, or Firm* — F. CHAU & ASSOCIATES, LLC

(57) ABSTRACT

A method for participating in a live broadcast via a viewer device includes running an application on the viewer device; using the running application to access a live broadcast that is being streamed by a streaming platform within an associated broadcast room; monitoring, by the running application, an operating instruction issued by a user of the viewer device; and controlling, by the running application, an operation of an interactive element associated with the broadcast room that is not managed by a platform of the streaming platform, based on the monitored operating instruction, the operation of the interactive element being observable only to at least one participant of the broadcast room. The at least one participant of the broadcast room includes the user, a content creator of the live broadcast, or another viewer using a device that is running the application to access the broadcast room.

24 Claims, 9 Drawing Sheets

(51) Int. Cl.
  *A63F 13/60* (2014.01)
  *H04N 21/2187* (2011.01)
  *H04N 21/422* (2011.01)
  *H04N 21/442* (2011.01)
  *H04N 21/472* (2011.01)

(56) References Cited

U.S. PATENT DOCUMENTS

| | | |
|---|---|---|
| 2015/0186542 A1 | 7/2015 | Singh et al. |
| 2018/0276306 A1 | 9/2018 | David |
| 2019/0166330 A1 | 5/2019 | Ma et al. |
| 2021/0052988 A1* | 2/2021 | Fear .................. H04N 21/2187 |
| 2021/0082988 A1 | 2/2021 | Fear |
| 2022/0358234 A1 | 11/2022 | Shank et al. |

* cited by examiner

SYSTEM AND METHOD FOR INTERACTIVE WEB-BROWSING VIA USER EQUIPMENT

CROSS-REFERENCE TO RELATED APPLICATION(S)

The present application is a Division of co-pending U.S. patent application Ser. No. 18/048,817, filed on Oct. 21, 2022, the entire contents of which is hereby incorporated by reference herein.

TECHNICAL FIELD

The present disclosure relates to web browsing and, more specifically, to a system and method for interactive web-browsing via user equipment.

DISCUSSION OF THE RELATED ART

Recently, users have been able to view live-streamed broadcasts and events over the Internet using a web browser running on a device such as a computer or smartphone. While in some instances, users might only be able to view the broadcast or event, in other instances, users are able to interact with the broadcast by participating in a live broadcast room website where multiple users may be able to view the live stream and chat in real-time with the content creators and other users. Users may also be able to send tips and virtual gifts to the content creators in real-time as the broadcast continues so as to win the attention of the content creator.

Users may even be able to participate in an on-line multiplayer game from the broadcast room website. Such games may be known as "live-stream games." Live-stream games may have certain advantages over typical multiplayer on-line games as the game itself is streamed and provided as a game-as-a-service and no separate game application need be downloaded and installed on the user's device.

While ordinary web browsers are generally used to view live-streamed broadcasts, participate in associated chatrooms, and to play live-stream games, specialized browsers for desktop computers and/or mobile devices may be used to enhance the live-stream experience.

SUMMARY

A method for participating in a live broadcast via a viewer device includes running an application on the viewer device; using the running application to access a live broadcast that is being streamed by a streaming platform within an associated broadcast room; monitoring, by the running application, an operating instruction issued by a user of the viewer device; and controlling, by the running application, an operation of an interactive element associated with the broadcast room that is not managed by a platform of the streaming platform, based on the monitored operating instruction, the operation of the interactive element being observable only to at least one participant of the broadcast room. The at least one participant of the broadcast room includes the user, a content creator of the live broadcast, or another viewer using a device that is running the application to access the broadcast room.

A method for interactive live broadcasting via viewer device includes browsing, via a user interface of an application running on the viewer device, one or more broadcast-room pages on one or more broadcast platforms, wherein broadcast content of each of the one or more broadcast-room pages is created and streamed by at least one streamer device to a corresponding broadcast platform of the one or more broadcast platforms; receiving, by the viewer device, an interactive operation instruction directly sent from another viewer device that is browsing the at least one broadcast-room page at the same time or forwarded by the at least one streamer device from the another viewer device, wherein the interactive operation instruction is additionally generated from the application rather than an intrinsic function of the one or more broadcast-room pages, and wherein the interactive operation instruction includes at least one of a viewer accessory control instruction, voice/text/video messaging instruction, game invitation or game interaction instruction; and in response to receiving the interactive operation instruction, generating, by the application, an interactive functionality corresponding to the interactive operation instruction.

A method for interactive online entertainment via user equipment includes visiting, via a user interface of an application running on a first user equipment, one or more web-pages directed to online entertainment; monitoring, by the first user equipment, interactive operation input by a first user with respect to at least one web-page of the one or more web-pages directed to online entertainment, wherein the interactive operation acts on an interactive element that is additionally configured by the application and is not an intrinsic function of the at least one web-pages directed to online entertainment; in response to detecting the interactive operation, generating, by the application, an interactive operation instruction for interacting with the at least one web-pages directed to online entertainment; sending the interactive operation instruction to an application running on a second user equipment that is accessing the at least one web-pages directed to online entertainment and/or a viewer accessory thereof, which enables the first user to obtain feedback of the interactive operation while browsing the at least one web-page, wherein the online-entertainment of the at least one web-page is provided through a first server to the application running on the first user equipment and the application running on the second user equipment respectively; receiving, by the application running on the second user equipment, the interactive operation from the first user equipment, wherein the application running on the first user equipment communicates with the application running on the second user equipment through a second server; and in response to receiving the interactive operation instruction, generating, by the application running on the second user equipment, an interactive functionality corresponding to the interactive operation instruction.

A system for live broadcasting includes a first device generating live broadcast content and sending the generated live broadcast content to a first server maintained by a first streaming platform, the first server publishing a first live broadcast based on the generated live broadcast content; a second server publishing a second live broadcast; and a viewer device running an application for accessing the first live broadcast and the second live broadcast. The application is configured to display a representation of the first live broadcast and the second live broadcast, simultaneously, to a user of the viewer device. The application is further configured to receive a selection of the first live broadcast from the user and display the first live broadcast to the user while superimposing a control panel for controlling an operation of a streaming accessory in communication with the first device, communication between the application and the streaming accessory managed by a third server that is not associated with the first streaming platform.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
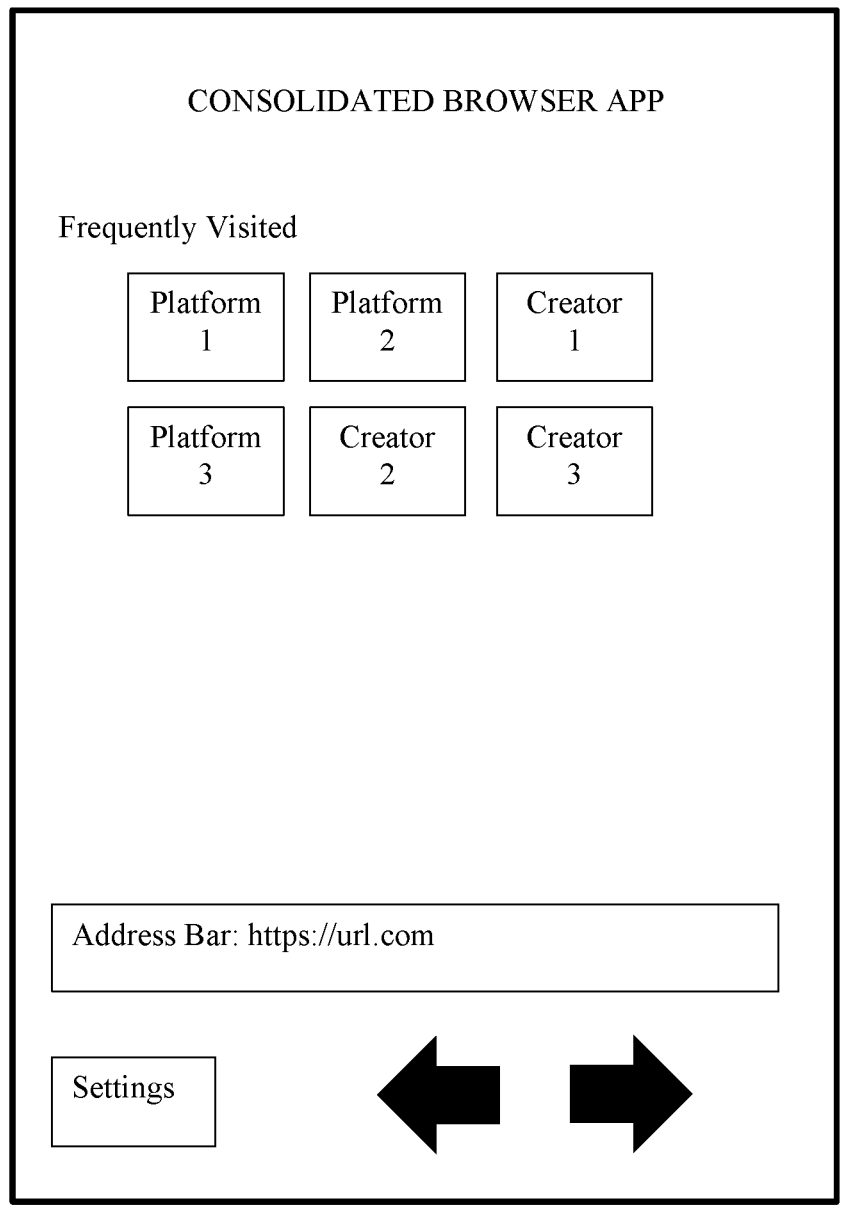
FIG. 1 is a schematic diagram illustrating a user interface (UI) element of the Consolidated Browser in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide an approach for interactive web-browsing that utilizes a specialized browser application running on a computer or mobile device, such as a smartphone or tablet, that is able to connect to one or more live-streaming sessions, over multiple live streaming platforms, and provide a streamlined and specialized user interface therein for viewing the live-stream, participating in a chat room associated with the live-stream, playing a video game associated with the live-stream and/or remotely controlling the operation of a sex toy device in the possession of a content creator of the live-stream and/or having the operation of a sex toy device in the user's possession controlled by the content creator and/or another participant in the live-stream.

The specialized browser may either be downloaded from an application repository associated with a user's device, such as APP STORE provided by Apple Inc. or GOOGLE PLAY provided by Alphabet Inc. or may be independently downloaded and installed (e.g., sideloaded) into the user's device. The specialized browser may combine features typical of a mobile browser, such as accepting URLs and rendering webpages, but the specialized browser may add to this capability, certain specialized capabilities for managing live-streaming sessions over multiple platforms, including providing customized user interfaces and consolidated alerts, and managing interactions and control over remotely operated sex toy devices. The specialized browser may be referred to herein as the Consolidated Browser.

Figure 5:
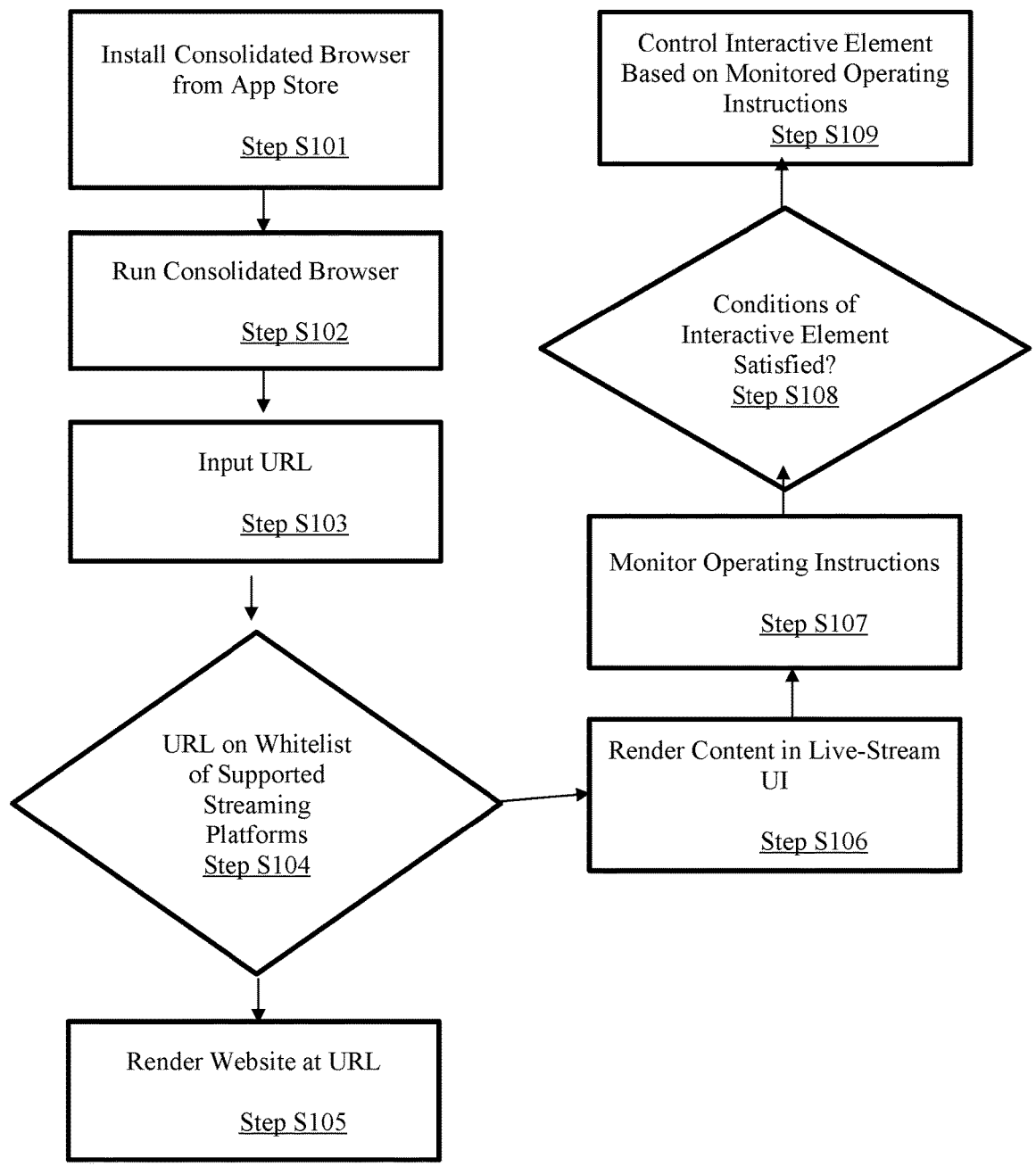
FIG. 5 is a flowchart illustrating a method for interactive web browsing in accordance with an exemplary embodiment of the present disclosure.

FIG. 1 is a schematic diagram illustrating a user interface (UI) element of the Consolidated Browser in accordance with exemplary embodiments of the present disclosure. FIG. 5 is a flowchart illustrating a method for interactive web browsing in accordance with an exemplary embodiment of the present disclosure, referring to FIGS. 1 and 5, using a viewer device, such as a smartphone, a user may first initiate the installation of the Consolidated Browser from an application repository (e.g., an app store) (Step S101). The user may then execute the Consolidated Browser app after it has been installed (Step S102).

Figure 2:
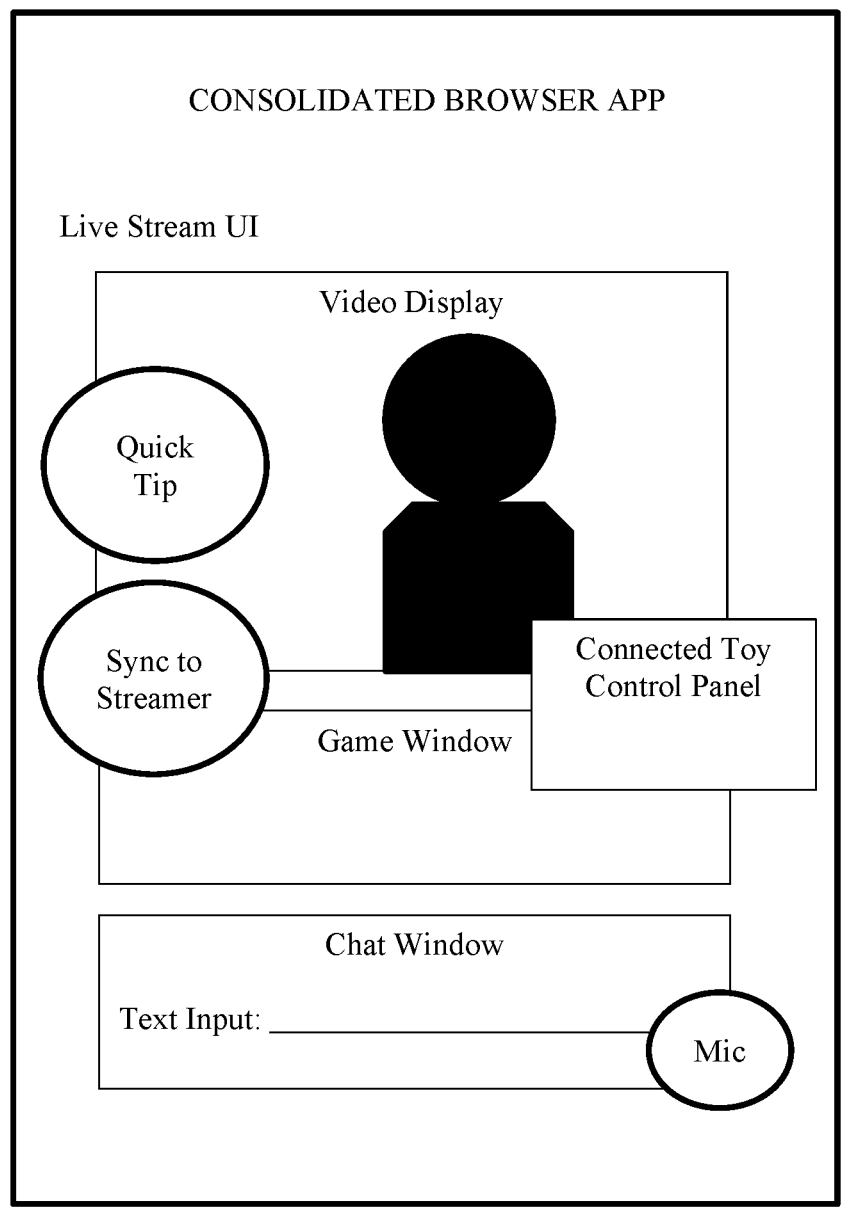
FIG. 2 is a schematic diagram illustrating a live-stream UI of the Consolidated Browser in accordance with exemplary embodiments of the present disclosure.

Exemplary embodiments of the present disclosure may thereby provide a user an address bar where the user can enter a URL or search criteria for searching for a particular URL. The user may input a URL within the address bar (Step S103). The Consolidated Browser may determine whether the input URL corresponds to a live-streaming platform or another form of website, for example, by consulting a whitelist of supported live-streaming platforms (Step S104). If the Consolidated Browser determines that the URL corresponds to another website, then the URL will be rendered as a website, for example, using an available rendering engine such as WEBKIT provided by Apple Inc., BLINK, provided by Alphabet Inc., GECKO provided by MOZILLA, or another suitable rendering engine (Step S105).

Where the Consolidated Browser determines that the URL corresponds to a supported live-streaming platform or another type of entertainment-enabled website for delivering content pre-registered in a specially supported website white list, rather than rendering the URL website, the Consolidated Browser will interface directly with the live-streaming platform to provide its livestreams to the Consolidated Browser's consolidated UI in which multiple live-streams across multipole different platforms may be accessed and participated in using a unified UI (Step S106) or to the Consolidated Browser's specialized UI such as a broadcast room page re-rendered like FIG. 2. Thus, exemplary embodiments of the present invention may determine whether an entered website URL corresponds to a specially supported website, and where it does, rather than rendering the website in a traditional manner, the website may be re-rendered in such a way as to provide enhanced interactive functionality within the Consolidated Browser app itself, such that the viewer/user can interact through a means of communication that is independent of the specially supported website and is handled directly by the Consolidated Browser and its assisting webservices to facilitate a more direct and engaging line of communication between and among viewer/users and the content provider/streamer, either by text chat, voice chat, video chat, direct control of each other's sex toys, and/or by the control of cameras or other streaming accessories corresponding to the content provider/streamer or any other device that contributes to the content creation while the viewer/user simultaneously participates in the live-stream via the associated streaming platform.

FIG. 2 is a schematic diagram illustrating a live-stream UI of the Consolidated Browser in accordance with exemplary embodiments of the present disclosure. As can be seen from this figure, the live-stream UI may display the live stream video, a chat window for participating in a chat associated with the live-stream, and various other elements which will be described in greater detail below.

As can be seen from FIG. 1, the Consolidated Browser may even maintain a list of recently/frequently visited live-streaming platforms and/or content creator subscriptions, proximate to the address bar, for example, on a same starting page as the address bar. Clicking or pressing on an icon associated with a given recently/frequently visited live-streaming platform may lead the user directly to a page showing available live streams associated with that platform. The user may then click on an available live stream to begin participation therein.

The user may also choose to subscribe/follow a particular content creator and the Consolidated Browser may send an alert to the user whenever that content creator has a livestream, regardless of the platform it is on. The Consolidated Browser may accomplish this task by interacting with a central server that checks for live streams across all supported platforms.

Figure 3:
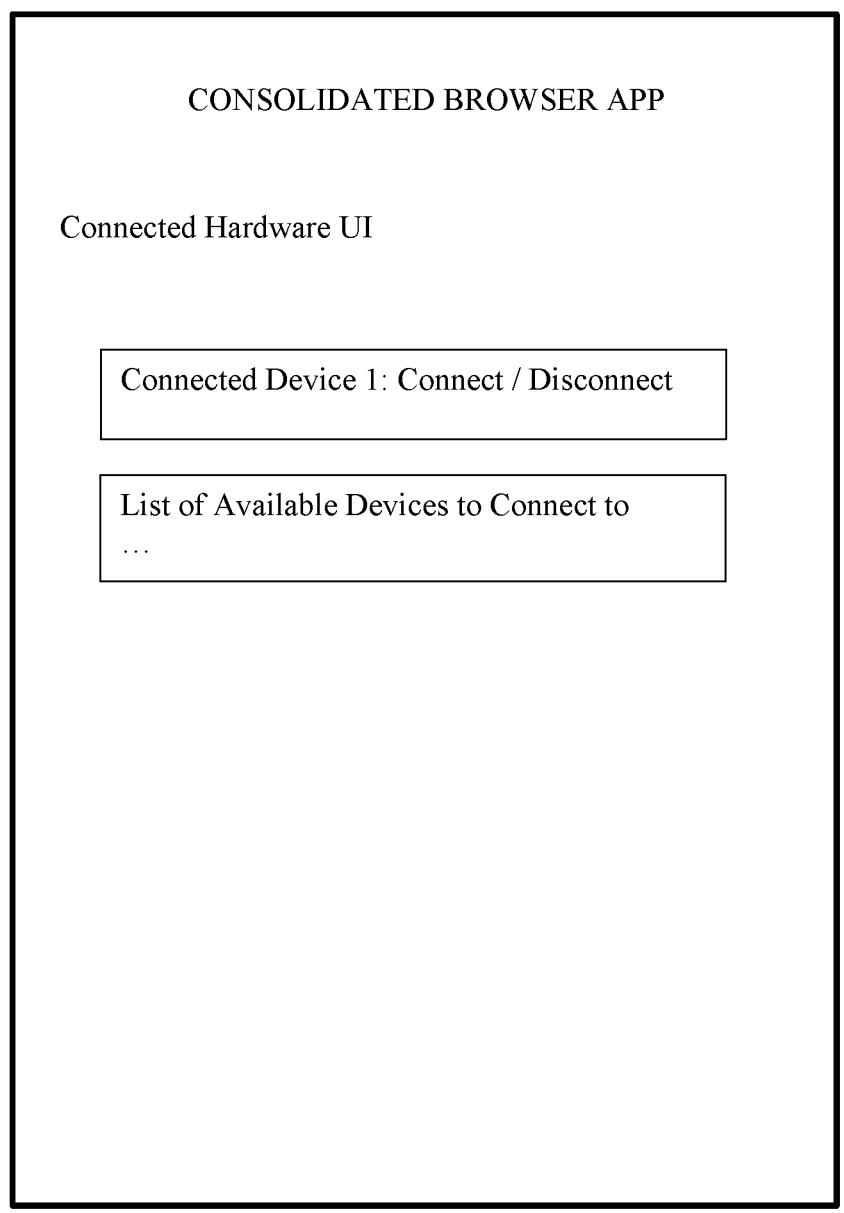
FIG. 3 is a schematic diagram illustrating a connected hardware UI of the Consolidated Browser in accordance with exemplary embodiments of the present disclosure.

As mentioned above, the Consolidated Browser may also provide a UI for the user to connect the Consolidated Browser to a local sex toy in the possession of or in proximity to the user for the purpose of offering access/control of this local sex toy to other viewers or content creators over live-streams. FIG. 3 is a schematic diagram illustrating a connected hardware UI of the Consolidated Browser in accordance with exemplary embodiments of the present disclosure. The Consolidated Browser may provide this access/control either by interfacing with access provided by the particular live-streaming platform or by a direct connection managed by the central server that bypasses the need to go through the live-stream platform, for example, where the user is using the Consolidated Browser and the content creator is using a compatible app or service (such as the Connect APP illustrated in FIG. 7) that is similarly in communication with the central server supporting the Consolidated Browser. In this respect, the content creator may make use of the central server to register a sex toy for remote control and the user may make use of the control panel functionality, such as that illustrated in FIG. 8, provided by the same central server to establish access/control of a sex toy of a content creator who is live streaming on a live streaming platform, without the control necessary being managed by the live streaming platform.

Figure 7:
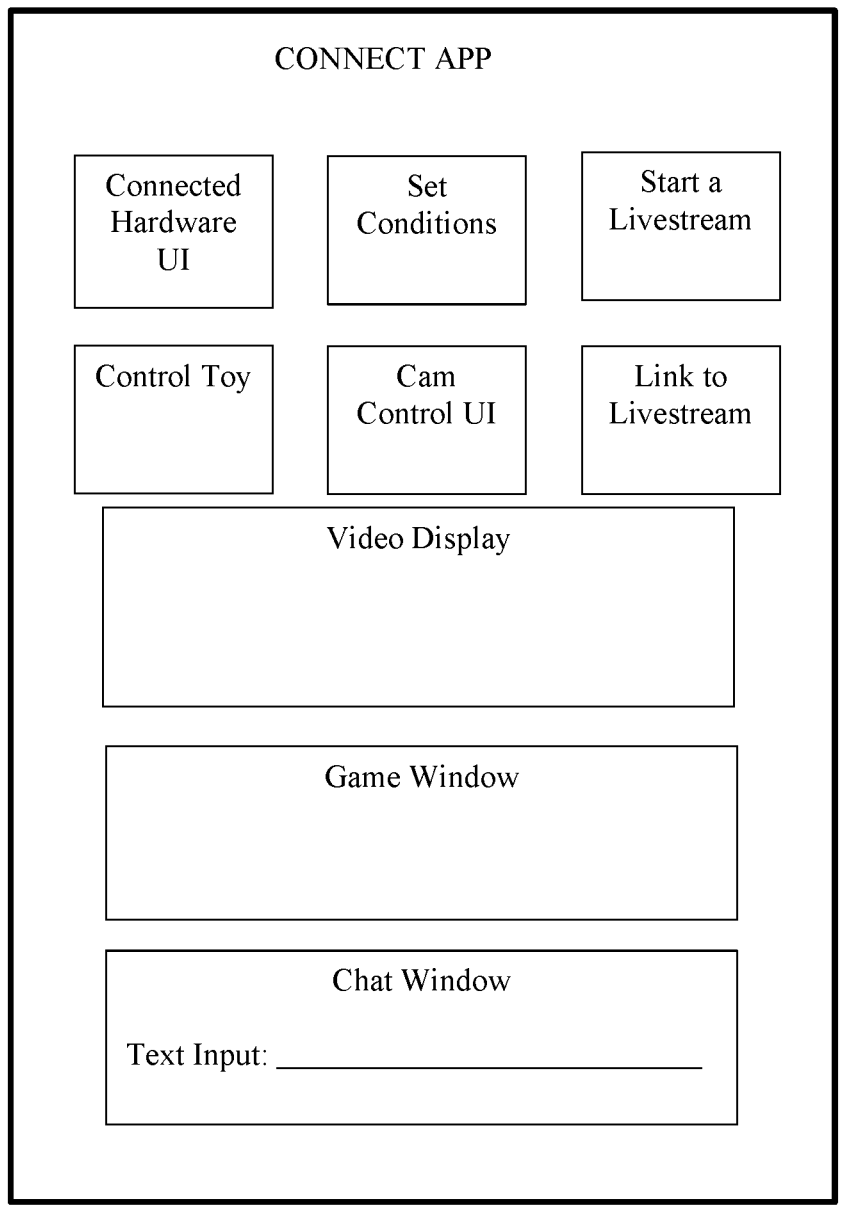
FIG. 7 is a diagram representing the Connect APP and some of the functionality made available thereby in accordance with exemplary embodiments of the present invention.

FIG. 7 is a diagram representing the Connect APP and some of the functionality made available thereby. The Connect APP, for example, may provide the content creator with a UI for connecting hardware, a UI for controlling connected sex toys, a UI for establishing gating conditions for control of their toys and cameras, a UI for controlling their own camera, a UI for starting a livestream on a streaming platform, and a UI for linking an existing livestream to the Connect APP. Other UI elements may also be included, for example, there may be a UI element for each function of the Connect APP discussed and/or described herein.

Figure 8:
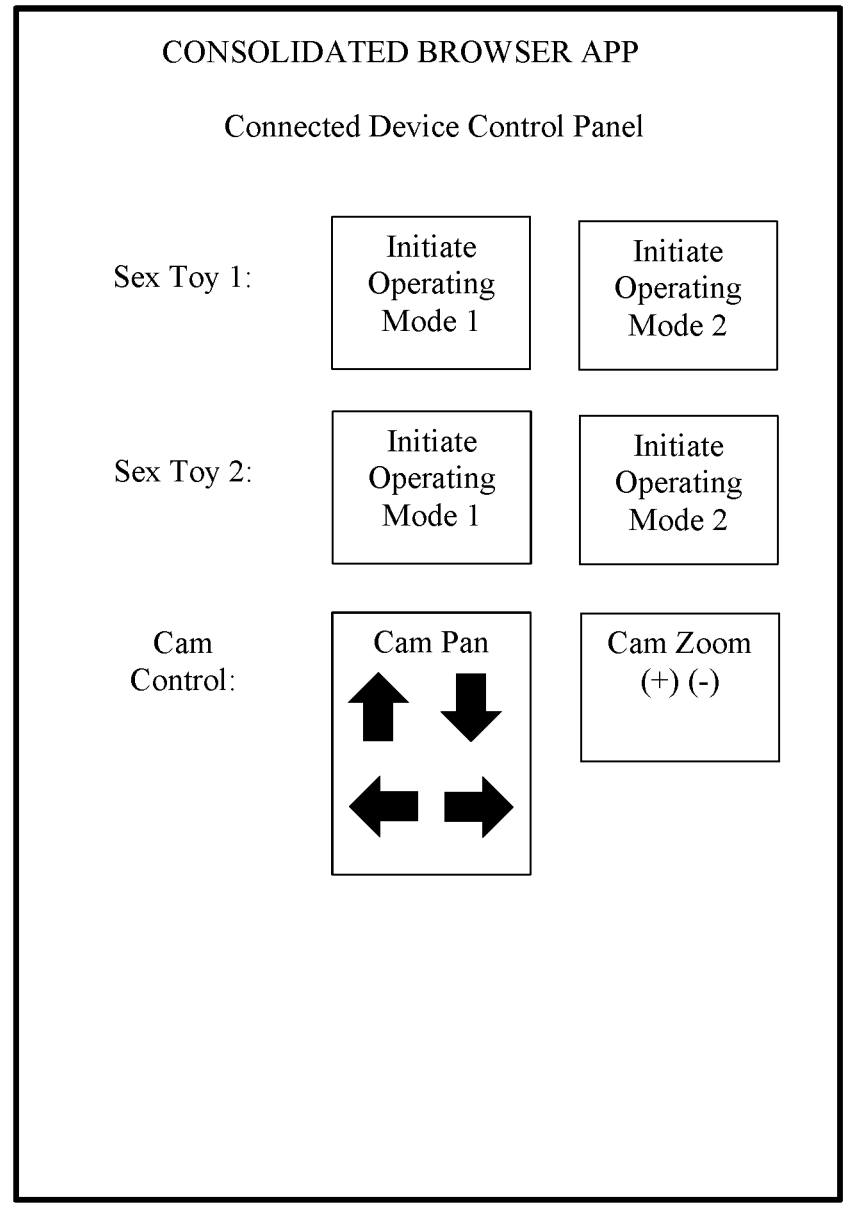
FIG. 8 is a diagram representing a connected device control panel within the Consolidated Browser App in accordance with exemplary embodiments of the present invention.

FIG. 8 is a diagram representing a connected device control panel within the Consolidated Browser App in accordance with exemplary embodiments of the present invention. One or more of these functions may be gated by the satisfaction of conditions established by the content creator, as described above, and this control panel may feature control buttons for initiating operational modes of one or more sex toys associated with the content creator and/or other viewers. The illustrated controls are symbolic but there is no limit to how detailed the control of the devices may be. In addition to controlling the sex toys, this control panel, or a similar control panel, may be used to control the operation of the camera of the content creator, including, but not limited to, directional panning and/or rotation, and zooming in/out.

The Consolidated Browser may additionally offer a filtering function to the user so that a browsing page of the Consolidated Browser may list, or graphically display, multiple broadcast rooms across different broadcast platforms. The respective content creators/models for these displayed broadcast rooms may use their devices to run software (locally or over one or more web services) to interface with the central server and locally connect their sex toys thereto so as to stream their content via different broadcast servers that correspond to broadcast platforms.

As discussed above, the Consolidated Browser may provide a similar UI for each live stream regardless of which platform that live stream is hosted on. Referring back to FIG. 2, this live stream UI may provide a window for playing the live-stream video, a window for showing chats, and a window for entering text to send to the chat. The live stream UI may also prominently show a quick tip icon that may float over the video window (although it may be moved) and may permit the user a quick way to send a monetary tip or some other transfer of points to the content creator, with the particulars of the transaction being managed by the Consolidated Browser app or its central server. Thus, the Consolidated Browser may be pre-programed with information on how to consummate a tip transaction for each of the supported platforms so as to handle tipping seamlessly to the user. In another embodiment, the quick tip icon may be used to autopilot an original html element (e.g., a tip sending button native to the live-stream platform) of the website.

Another quick icon may be similarly displayed along with the quick tip icon. This icon may be a "sync to streamer" icon that allows for the operation of a user's sex toy to be synchronized to the operation of the content creator's sex toy. When activated, the Consolidated Browser may monitor sex toy activity of the content creator and then replicate this activity to the user's sex toy that is linked to the device that the Consolidated Browser is running on, for example, via Bluetooth.

The live stream UI may also provide UI elements for performing all functions that are performable by directly connecting to the live stream platforms, for example, by accessing using a conventional web browser, however, each of these functionalities may be represented in a unified way so as to provider the user with a seamless experience that is consistent across diverse platforms.

For example, microphone functionality ("Mic") may be provided to allow the user to activate the microphone of the user's device so as to contribute audio to the live-stream or directly to the content creator. The microphone functionality may be used either to send a recorded message that the content creator can listen to when ready, or to send audio in real-time to be heard by the content creator and/or other viewer participants.

When the Consolidated Browser is rendering a livestream from information derived from a live stream platform, the Consolidated Browser may continue to monitor for special operating instructions of the viewer (Step S107) that may be used to perform operations specific to the Consolidated Browser, as opposed to engaging with features of the live-stream platform. These operating instructions may relate to, for example, the games played within the live stream chat room or the control of connected devices such as cameras and sex toys.

The microphone feature, as well as other features described herein, may be restricted from use until a tip of a predetermined value is transferred to the content creator, or by other conditions set by the content creator. In this way, the special functionality of the Consolidated Browser may be gated by various conditions, such as a tipping condition. For example, the icons representing these features may be hidden or deactivated (e.g., grayed out) prior to the predetermined conditions being met. The predetermined conditions are not necessarily limited to tipping conditions as predetermined conditions may include, for example, earning a VIP designation within the Consolidated Browser app, purchasing an NFT privilege, connecting to a specific toy via the Consolidated Browser, etc. The Consolidated Browser may therefore check for the satisfaction of conditions when an instruction has been detected (Step S108). The Consolidated Browser may receive these tip conditions from the content creator and then gate access to these features in a manner consistent with the requests of the content creator submitted either through the Consolidated Browser or through a control panel accessible by a conventional browser, for example, the control panel being maintained by the central server, or though functionality of the individual platforms. Thus, when instructions have been detected (in Step S107) and it is determined that the necessary conditions have been satisfied (in Step 108) then the Consolidated Browser may extend control of the interactive element to the viewer (Step S109), for example, to play a game, control a sex toy of the content creator, and/or control a camera of the content creator.

The Consolidated Browser, for example through its associated central server, can directly handle text chats, interactive video games, and the sending of multimedia, among the user, the content creator, and other users accessing a same livestream using the Consolidated Browser, without going through the platform. In this way, communications associated with a live stream may circumvent the live stream platform to provide a greater level of engagement that is available only to users of the Consolidated Browser and not to other users that may be directly accessing the live stream through the platform's own web portal.

The Consolidated Browser may also provide to the user a control panel to control a mode of operation of a content creator's connected sex toy. This feature may also be gated by the satisfaction of a predetermined tip. The control panel, by having both the user and the content creator utilize the Consolidated Browser, may provide a very high level of control over the sex toy that might not otherwise be possible when having to go through the live streaming platform alone, and as discussed above, this control may be managed by the central server rather than the live streaming platform. Moreover, neither the user nor the content creator need make use of browser plugins and the like. However, where the content creator is not utilizing the Consolidated Browser, the Consolidated Browser may still manage a connection between the user's control panel and a browser plugin of the content creator designed for providing remote control of the content creator's sex toy.

The user may jump back and forth between the control panel and the live stream UI, for example, by the use of a fast switch icon displayed on each UI or the control panel may be implemented as a floating element on top of the live stream UI. The Consolidated Browser may also grant the content creator access to the connected sex toys of the user in a similar manner and the user can select among his registered connected sex toys to grant remote access to.

According to some exemplary embodiments of the present disclosure, and as mentioned above, the Consolidated Browser may provide to the user, for example, upon the satisfaction of a predetermined tip, control over the content creator's camera. For example, pan, tilt, zoom, and camera switch functionality may be transferred to the user. This may be implemented by the content creator registering one or more cameras with the Consolidated Browser and then control over these cameras may be placed under the direction of the user within a control panel, in a manner similar to how the user may gain control to a sex toy of the content creator. The central server of the Consolidated Browser may be used to negotiate camera/sex toy control in a secure environment without having to open control over a website such as the web portal of the live stream platform.

As discussed above, the Consolidated Browser may manage the play of interactive games between one or more users and the content creator. The Consolidated Browser may be used to render advanced graphics and/or sound associated with an interactive game occurring on the live stream platform, or the Consolidated Browser may host its own games that are played among live stream participants (e.g., the user, other viewers, and the content creator) while circumventing interaction with the platform.

The user may select a game play icon from the live stream UI and may bring up a game play UI where the user can create a new game or participate in a game being played. The game may be participated in by all live stream participants utilizing the Consolidated Browser and the Consolidated Browser may also provide a rendering for other games hosted on the platform. In this way, each participant may see and interact with the game being played. Rewards for winning games may similarly be used to grant access to the sort of controls discussed above that are gated.

The central server may monitor live streams, even when the user is not, so that the Consolidated Browser may be able to present to the user playbacks of prior live streams that were missed, or provide instant-replay type functionality where the user is participating in a live stream. The Consolidated Browser may even be able to provide playback of synchronized sex toy control, in addition to playback of live stream audio/video by recording toy control commands embedded within the recording of the live stream. Recordings may be maintained on the central server for a time, in a manner consistent with the requirements of the platform and content creator, and once again, this functionality may be gated by a tipping requirement.

The Consolidated Browser may provide other features such as matching sex toy control to website content accessed by the Consolidated Browser as a standard website, for example, by matching sex toy control to music, movies, audiobooks, etc. The user may be able to initiate, end, and adjust this sex toy control rendering by accessing a browsing control panel.

Figure 4:
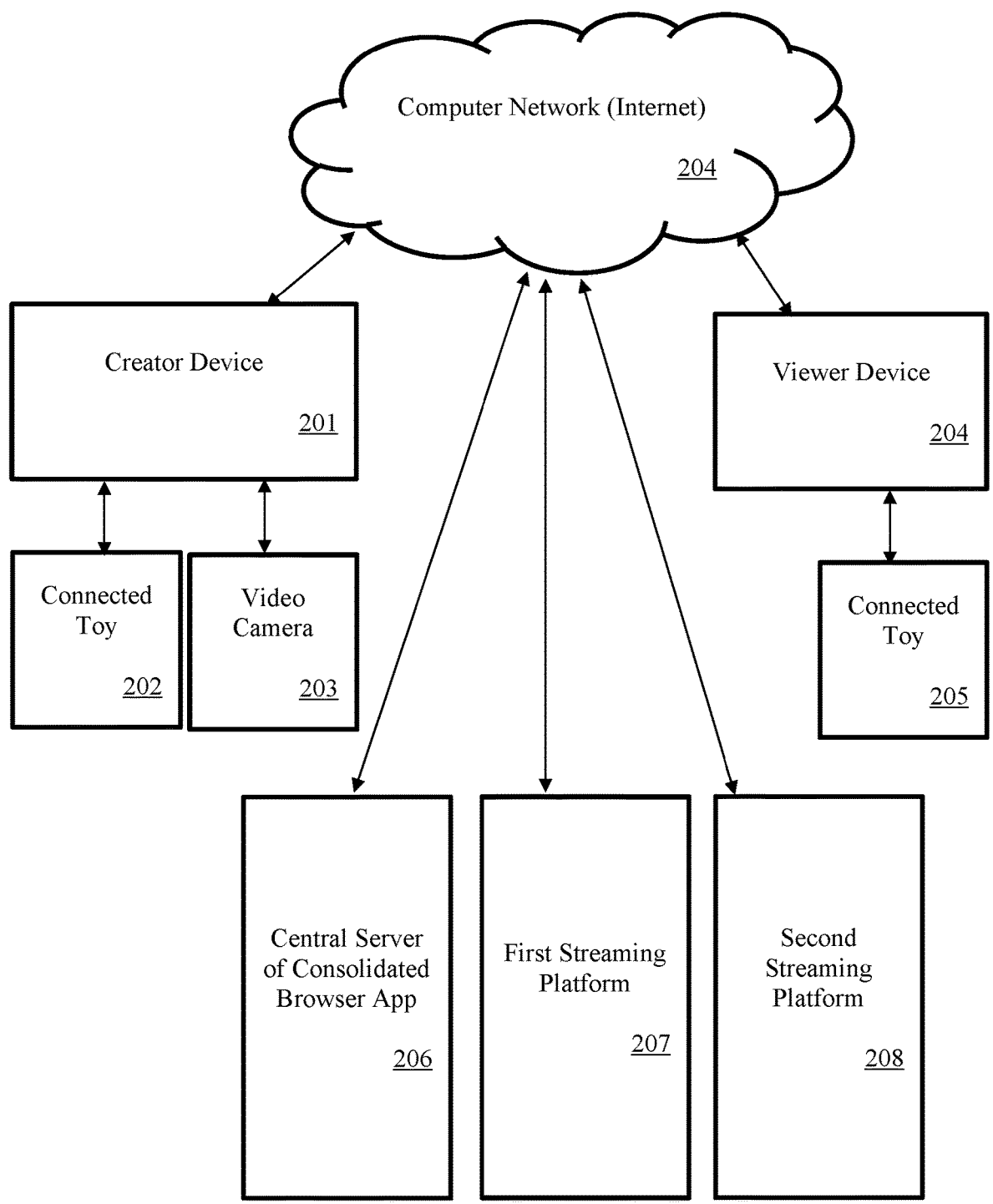
FIG. 4 is a schematic diagram illustrating a system for interactive web browsing in accordance with exemplary embodiments of the present disclosure.

FIG. 4 is a schematic diagram illustrating a system for interactive web browsing in accordance with exemplary embodiments of the present disclosure. As can be seen from this figure, a creator device 201 may run an application or web service for connecting to a central server 206 of the consolidated browser. This application or web service may be, for example, a version of the Consolidated Browser, but may alternatively be a custom application developed for granting content creators direct access to the functionality of the Central Server 206. The creator device 201 may be connected to a sex toy 202 via a local connection such as Bluetooth or wired USB. This connection may be managed by the application or web service discussed above. A video camera 203 may also be connected to the creator device 201 via a wired and/or wireless connection, or the video camera 203 may be part of the creator device 201. Control of the sex toy 202 and/or the camera 203 may be managed by the creator device 201 and this control may be granted remotely in accordance with the Consolidated Browser. The creator device 201 may be connected to a wide area computer network 204, such as the Internet.

The central server associated with the Consolidated Browser app 206 may also be connected to the computer network 204 so that the content creator app/web service (referred to herein as the "Connect APP") may contact the central server 206 over the computer network 204 so that the central server 206 may negotiate functionality of the Consolidated Browser, given to the viewers using the Consolidated Browser, that is not handled by the streaming platforms.

While there may be any number of streaming platforms whitelisted within the Consolidated Browser, each streaming platform may operate its own server(s) for hosting the live streams on its platform. A first streaming platform server 207 and a second streaming platform server 208 are shown for simplicity and each of these servers connects to the computer network 204 and in that way, the central server of the consolidated browser app 206 is able to observe data from the various streaming platforms.

There may be any number of viewers running the Consolidated Browser and each may have a viewer device 204, which may also be a smartphone, etc. The viewer device 204 may also have a sex toy 205 connected thereto, for example, for performing the synchronization discussed above.

Figure 6:
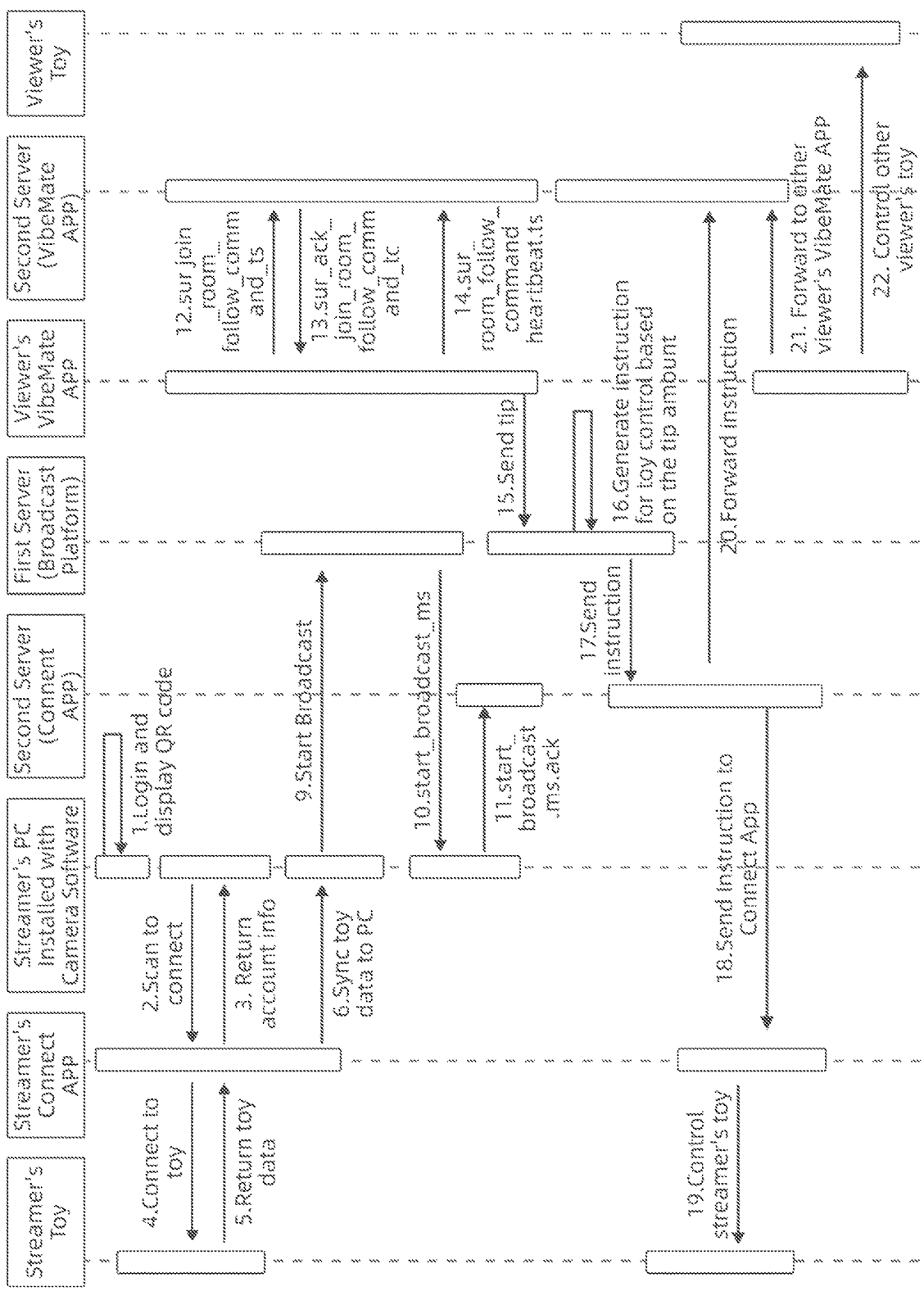
FIG. 6 is a signal diagram illustrating an approach for performing such an interaction.

As discussed above, exemplary embodiments of the present disclosure may utilize the Consolidated Browser to manage various interactions between the viewer and the content creator ("streamer") outside of the integration of the streaming platform. An example of one such interaction is the "sync with streamer" functionality discussed above in which the Connect APP manages the synchronization of operation of a sex toy of the content creator and a sex toy of the viewer. FIG. 6 is a signal diagram illustrating an approach for performing such an interaction. This discussion is provided as an example of how the Consolidated Browser and related elements may perform many such interactions.

First, the streamer may log in to the streaming platform using a computer and display a QR code for the purpose of allowing the streamer's smartphone running the Connect APP to engage with the streaming session (1). Next, the streamer's smartphone running the Connect APP may scan the displayed QR code to engage (2). Account information may then be sent from the streamer's PC to the Connect APP running on the smartphone (3). The streamer's PC to the Connect APP running on the smartphone may then connect to the streamer's sex toy (4) and the streamer's sex toy may return toy data pertaining to the operation thereof (5). The Connect APP running on the smartphone may then send the toy data to the streamer's PC (6).

The streamer may then begin the live-streaming session with the server of the streaming ("broadcast") platform (9) ("the first server"). The first server may interact with the streamer's PC to manage native interactions of the broadcast platform (10). Native interactions may include those interactions that the broadcast platform is known to manage, such as receiving streaming signals and relaying those signals to the viewers of the live-stream and managing basic chat room functionality such as sending and broadcasting text messages amongst the viewers and streamer and facilitating the transaction of tipping, which is the sending of points, tokens, and other representations of monetary value from the viewers to the broadcaster. The streamer's PC may then interact with a server of the Consolidated Browser ("second server"), via the Connect APP, to engage the second server to handle various interactions associated with the live stream that are not managed by the broadcast platform (i.e., to manage interactions that are not native to the broadcast platform) (11).

The viewer, running the Consolidated Browser, may then engage with the second server to join the live stream (12). The second server may interact with the viewer's smart phone running the Consolidated Browser to negotiate interactions and to participate in those functions provided by the Consolidated Browser that are not native to the streaming platform (13 & 14). The Consolidated Browser may also intermediate the interaction of the viewer with the native functionality of the live stream so as to provide the unified user experience discussed above. This may include the rendering of the live stream within the Consolidated Browser and the sending of a tip from the viewer to the streamer, which may be performed though the first server managed by the broadcast platform (15). The broadcast platform may thereafter generate and/or pass instructions for sex toy control to the second server (17) whose responsibility it is to implement toy control commands. The second server may send the toy control commands to the streamer's smartphone running the Consolidated Browser (18) where the commands may then be passed back to the streamer's sex toy (19) thereby allowing the viewer to control the operation of the streamer's sex toy.

The second server, associated with the Consolidated Browser, may then forward sex toy instructions that are based on the instructions being implemented by the streamer's sex toy, back to the viewer's smart phone running the Consolidated Browser. These instructions may be referred to herein as "feedback" as they are instructions for the viewer's sex toy based on the operation of the streamer's sex toy. Here, this interaction is illustrated as including passing instructions between two implementations of the second server (20) and then forwarding instructions from the second implementation of the second server to the viewer's device (21). However, it is to be understood that the second server may be embodied as a distributed server having any number of actual server computers, as is also the case for the first server associated with the broadcast platform. For example, here, the first implantation of the Second Server may be associated with the Connect App of the streamer's PC while the second implementation of the Second Server may be associated with the Consolidated Browser (shown in this figure as the "VibeMate APP"). Alternatively, a single server may be relied upon to handle all functionality of the second server. Ultimately, however, the operation of the viewer's sex toy may be controlled according to the commands sent by the viewer's device. As the commands to control the viewer's sex toy are substantially synchronized with those of the streamer's sex toy, the "sync with streamer" functionality has been performed.

There may be additional viewers running the Consolidated Browser and viewing the same streaming content. For these additional viewers, instructions and communications from the Second Server associated with the Connect App may also be passed to a Second Server associated with their implementation of the Consolidated Browser (20) and these instructions and communications may then be passed on from the Second Server associated with their implementation of the Consolidated Browser to their implementation of the Consolidated browser (21) and in response, a sex toy of that viewer may be controlled (22) according to the passed instructions, for example, to implement the feedback discussed above.

Figure 9:
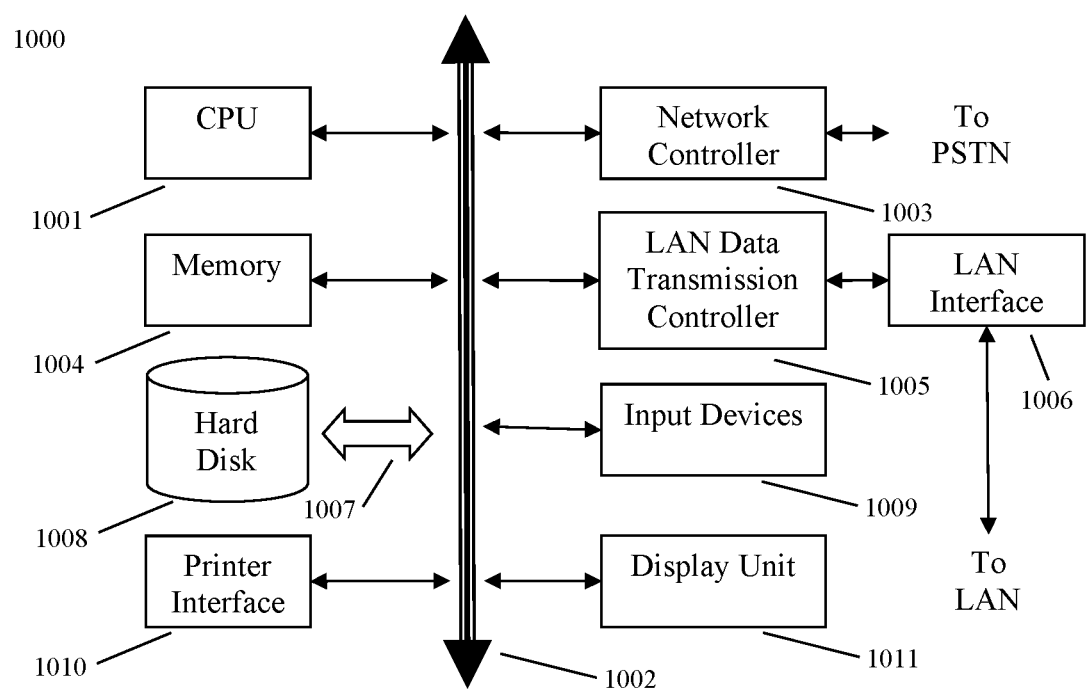
FIG. 9 shows an example of a computer system capable of implementing the method and apparatus according to embodiments of the present disclosure.

FIG. 9 shows an example of a computer system which may implement a method and system of the present disclosure. The system and method of the present disclosure may be implemented in the form of a software application running on a computer system, for example, a smartphone, a server, and/or a personal computer (PC), etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for interactive live broadcasting via viewer device, comprising:
browsing, via a user interface of an application running on a first viewer device, one or more broadcast-room pages on one or more broadcast platforms, wherein broadcast content of each of the one or more broadcast-room pages is created and streamed by at least one streamer device to a corresponding broadcast platform of the one or more broadcast platforms;
receiving, by the first viewer device, an interactive operation instruction directly sent from a second viewer device that is browsing the at least one broadcast-room page at the same time or forwarded by the at least one streamer device from the second viewer device, wherein the interactive operation instruction is additionally generated from the application rather than an intrinsic function of the one or more broadcast-room pages, and wherein the interactive operation instruction includes a viewer accessory control instruction for controlling, by the first viewer device, an accessory connected to the second viewer device; and
in response to receiving the interactive operation instruction, generating, by the application, a control panel is disposed on the first viewer device for controlling the accessory connected to the second viewer device.

2. The method of claim 1, wherein the accessory connected to the second viewer device is a sex toy.

3. The method of claim 1, wherein the accessory connected to the second viewer device is a camera.

4. The method of claim 1, wherein the control panel is mounted as a widget on or embedded within the first viewer device.

5. The method of claim 1, wherein the viewer accessory control instruction is gated by a tipping operation or a privileged identity of a user.

6. The method of claim 1, wherein each of the one or more broadcast platforms is hosted by a corresponding first server and the interactive functionality is hosted by a second server.

7. The method of claim 1, wherein the application provides access to the one or more broadcast-room pages as a curated list of broadcast-room pages of a plurality of streaming platforms filtered to show only broadcast-room pages that are broadcasting from a device running the application or from a device running software configured to communicate with a server associated with the application.

8. The method of claim 1, wherein the controlling of the accessory connected to the second viewer device is observable to devices running the application and is not observable to devices not running the application.

9. A system for interactive live broadcasting via viewer device, comprising:
a first viewer device running an application having a user interface displaying one or more broadcast-room pages on one or more broadcast platforms, wherein broadcast content of each of the one or more broadcast-room pages is created and streamed by at least one streamer device to a corresponding broadcast platform of the one or more broadcast platforms; and
a second viewer device sending an interactive operation instruction directly to the first viewer device, the second viewer device browsing the at least one broadcast-room page at the same time as the first viewer device,
wherein the interactive operation instruction is additionally generated from the application rather than an intrinsic function of the one or more broadcast-room pages, and wherein the interactive operation instruction includes a viewer accessory control instruction for controlling, by the first viewer device, an accessory connected to the second viewer device, and
wherein in response to receiving the interactive operation instruction, generating, by the application, a control panel is disposed on the first viewer device for controlling the accessory connected to the second viewer device.

10. The system of claim 9, wherein the control panel is mounted as a widget on or embedded within the first viewer device.

11. The system of claim 9, wherein the viewer accessory control instruction is gated by a tipping operation or a privileged identity of a user.

12. The system of claim 9, wherein each of the one or more broadcast platforms is hosted by a corresponding first server and the interactive functionality is hosted by a second server.

13. The system of claim 9, wherein the application provides access to the one or more broadcast-room pages as a curated list of broadcast-room pages of a plurality of streaming platforms filtered to show only broadcast-room pages that are broadcasting from a device running the application or from a device running software configured to communicate with a server associated with the application.

14. The system of claim 9, wherein the controlling of the accessory connected to the second viewer device is observable to devices running the application and is not observable to devices not running the application.

15. A non-transitory computer-readable storage medium, comprising:
machine-readable instructions, wherein the machine-readable instructions when executed by a processor of a controller, enable the controller to:

browse, via a user interface of an application running on a first viewer device, one or more broadcast-room pages on one or more broadcast platforms, wherein broadcast content of each of the one or more broadcast-room pages is created and streamed by at least one streamer device to a corresponding broadcast platform of the one or more broadcast platforms;

receive, by the first viewer device, an interactive operation instruction directly sent from a second viewer device that is browsing the at least one broadcast-room page at the same time or forwarded by the at least one streamer device from the second viewer device, wherein the interactive operation instruction is additionally generated from the application rather than an intrinsic function of the one or more broadcast-room pages, and wherein the interactive operation instruction includes a viewer accessory control instruction for controlling, by the first viewer device, an accessory connected to the second viewer device; and in response to receiving the interactive operation instruction, generate, by the application, a control panel is disposed on the first viewer device for controlling the accessory connected to the second viewer device.

16. The non-transitory computer-readable storage medium of claim 15, wherein the application provides access to the one or more broadcast-room pages as a curated list of broadcast-room pages of a plurality of streaming platforms filtered to show only broadcast-room pages that are broadcasting from a device running the application or from a device running software configured to communicate with a server associated with the application.

17. The non-transitory computer-readable storage medium of claim 15, wherein controlling of the accessory connected to the second viewer device is observable to devices running the application and is not observable to devices not running the application.

18. A method for interactive online entertainment via user equipment, comprising:

visiting, via a user interface of an application running on a first user equipment, one or more webpages directed to online entertainment;

monitoring, by the first user equipment, interactive operation input by a first user with respect to at least one webpage of the one or more webpages directed to online entertainment, wherein the interactive operation acts on an interactive element that is additionally configured by the application and is not an intrinsic function of the at least one web-pages directed to online entertainment;

in response to detecting the interactive operation, generating, by the application, an interactive operation instruction for interacting with the at least one webpages directed to online entertainment;

sending the interactive operation instruction to an application running on a second user equipment that is accessing the at least one web-pages directed to online entertainment and/or a viewer accessory thereof, which enables the first user to obtain feedback of the interactive operation while browsing the at least one web-page, wherein the online-entertainment of the at least one web-page is provided through a first server to the application running on the first user equipment and the application running on the second user equipment respectively;

receiving, by the application running on the second user equipment, the interactive operation from the first user equipment, wherein the application running on the first user equipment communicates with the application running on the second user equipment through a second server; and in response to receiving the interactive operation instruction, generating, by the application running on the second user equipment, an interactive functionality corresponding to the interactive operation instruction.

19. The method of claim 18, wherein the interactive operation instruction is a game invitation or a game interaction instruction and a video game, that constitutes the interactive functionality, is launched from the first user equipment in response thereto.

20. The method of claim 18, wherein the interactive functionality is mounted as a widget on or embedded as a control on the first user equipment.

21. The method of claim 18, wherein the interactive functionality is gated by a tipping operation or a privileged identity of a user.

22. The method of claim 18, wherein each of the webpages directed to online entertainment is hosted by a corresponding first server and the interactive functionality is hosted by a second server.

23. The method of claim 18, wherein the application provides access to the webpages directed to online entertainment as a curated list of webpages directed to online entertainment of a plurality of platforms filtered to show only webpages that are hosted from a device running the application or from a device running software configured to communicate with a server associated with the application.

24. The method of claim 18, wherein the interactive functionality is observable to devices running the application and is not observable to devices not running the application.

* * * * *